US 12,013,939 B2

United States Patent
Kawakita

(10) Patent No.: US 12,013,939 B2
(45) Date of Patent: Jun. 18, 2024

(54) ANALYSIS SYSTEM, ANALYSIS METHOD, ANALYSIS DEVICE, AND STORAGE MEDIUM FOR ANALYZING OPERATION OF A PROGRAM EXECUTED IN AN ANALYSIS ENVIRONMENT

(71) Applicant: NEC Corporation, Tokyo (JP)

(72) Inventor: Masaru Kawakita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 134 days.

(21) Appl. No.: 16/990,319

(22) Filed: Aug. 11, 2020

(65) Prior Publication Data

US 2020/0401698 A1 Dec. 24, 2020

Related U.S. Application Data

(63) Continuation of application No. 15/575,480, filed as application No. PCT/JP2016/002846 on Jun. 13, 2016, now Pat. No. 10,776,486.

(30) Foreign Application Priority Data

Jun. 16, 2015 (JP) .................................. 2015-120712

(51) Int. Cl.
*G06F 21/56* (2013.01)
*G06F 9/445* (2018.01)
(Continued)

(52) U.S. Cl.
CPC ........ *G06F 21/566* (2013.01); *G06F 9/44505* (2013.01); *G06F 9/455* (2013.01);
(Continued)

(58) Field of Classification Search
CPC .................................................. G06F 21/566
See application file for complete search history.

(56) References Cited

U.S. PATENT DOCUMENTS 3,858,182 A * 12/1974 Delagi .................... G06F 21/54
726/16
5,781,755 A * 7/1998 Uchino ................. G06F 9/4401
718/100
(Continued)

FOREIGN PATENT DOCUMENTS

JP 2006-318292 A 11/2006
JP 2007-334536 A 12/2007
(Continued)

OTHER PUBLICATIONS

Wang et al, "A Novel Flow Multiplication Attack against Tor", IEEE, 6 pages. (Year: 2009).*

(Continued)

*Primary Examiner* — Ponnoreay Pich
(74) *Attorney, Agent, or Firm* — Sughrue Mion, PLLC

(57) ABSTRACT

Provided is an analysis system including: an operation analysis unit that analyzes operation of an analysis target program that is a target program to be analyzed, by executing the analysis target program in a second execution environment that is a computing environment for analysis, the second execution environment being configured to emulate at least a partial configuration of a first execution environment that is a computing environment for real operation where the analysis target program is able to be executed; and a configuration unit that builds the second execution environment capable of emulating a specific configuration of the first execution environment, the specific configuration relevant to an operation of the analysis target program, by modifying at least a partial configuration of the second execution environment in accordance with the operation of the analysis target program analyzed by the operation analysis unit.

17 Claims, 14 Drawing Sheets

(51) Int. Cl.
*G06F 9/455* (2018.01)
*G06F 21/53* (2013.01)

(52) U.S. Cl.
CPC .......... *G06F 9/45558* (2013.01); *G06F 21/53* (2013.01); *G06F 21/56* (2013.01)

(56) References Cited

U.S. PATENT DOCUMENTS

| | | | | |
|---|---|---|---|---|
| 5,850,545 | A * | 12/1998 | Matsushita | G06F 9/44505 713/1 |
| 6,253,224 | B1 * | 6/2001 | Brice, Jr. | G06F 9/45558 718/1 |
| 6,907,396 | B1 * | 6/2005 | Muttik | G06F 21/56 703/22 |
| 7,664,626 | B1 * | 2/2010 | Ferrie | G06F 9/455 703/23 |
| 9,116,733 | B2 * | 8/2015 | Banga | G06F 9/455 |
| 9,626,509 | B1 * | 4/2017 | Khalid | G06F 21/53 |
| 10,776,486 | B2 * | 9/2020 | Kawakita | G06F 21/566 |
| 2007/0016953 | A1 * | 1/2007 | Morris | G06F 21/56 726/24 |
| 2008/0016339 | A1 * | 1/2008 | Shukla | G06F 21/54 713/164 |
| 2008/0235756 | A1 * | 9/2008 | Cohen | G06F 9/45533 726/21 |
| 2008/0307397 | A1 * | 12/2008 | Angell | G06F 11/3604 717/131 |
| 2010/0180344 | A1 * | 7/2010 | Malyshev | H04L 63/145 726/23 |
| 2010/0192223 | A1 | 7/2010 | Ismael et al. | |
| 2011/0078794 | A1 | 3/2011 | Manni et al. | |
| 2011/0145926 | A1 * | 6/2011 | Dalcher | G06F 21/552 726/26 |
| 2011/0247072 | A1 | 10/2011 | Staniford et al. | |
| 2013/0117849 | A1 * | 5/2013 | Golshan | G06F 21/53 726/23 |
| 2013/0347131 | A1 * | 12/2013 | Mooring | G06F 21/556 726/29 |
| 2015/0121531 | A1 * | 4/2015 | Pintiysky | G06F 11/1438 726/24 |
| 2015/0161381 | A1 * | 6/2015 | Sun | G06F 21/54 726/22 |
| 2015/0261955 | A1 * | 9/2015 | Huang | H04L 63/1433 726/23 |
| 2020/0401698 | A1 * | 12/2020 | Kawakita | G06F 9/455 |

FOREIGN PATENT DOCUMENTS

| | | |
|---|---|---|
| JP | 2008-178352 A | 8/2008 |
| JP | 2009-181335 A | 8/2009 |
| JP | 2010-146420 A | 7/2010 |
| JP | 2010-198054 A | 9/2010 |
| JP | 2011-013917 A | 1/2011 |
| JP | 2011-154727 A | 8/2011 |
| JP | 2012-221170 A | 11/2012 |
| JP | 2013-514594 A | 4/2013 |
| JP | 2014-504765 A | 2/2014 |
| JP | 2014-238870 A | 12/2014 |
| WO | 2004/075060 A1 | 6/2006 |

OTHER PUBLICATIONS

JP Office Action for JP Application No. 2020-182033, dated Jun. 28, 2022 with English Translation.
Japanese Office Action for JP Application No. 2020-182033 dated Dec. 14, 2021 with English Translation.
Hidehiko Tanaka et al., "A method, a research report, and a research Report of Bot infections using an instruction server domain name of"., Research Report 2006-CSEC-35-3, Japan, Information Processing Society, Dec. 8, 2006, vol. 2006, No. 129. p. 13-18.
Otsuki et al., "System Call Tracer based on Virtual Machine Monitor for Malware Analysis", Information processing society, Japan, Information Processing Engineers, Japan, Information Processing society, Sep. 15, 2014, vol. 55, No. 9, pp. 2034-2046.
Izumida et al., "A Method for Analyzing Malware using Lightweight Emulation and Static Analysis of Binary Code", an information processing society research report, Japan, a Society information processing society, Apr. 15, 2010, p. 1-8.
Kasama et al., "On the Power of Decoy Injection which Threatens Public Malware Sandbox Analysis Systems", Journal of Information Processing Society, Journal vol. 52, No. 9, Japan, General Incorporated Information Processing Society, Sep. 15, 2011, vol. 52, pp. 2761-2774.
Murakami et al., "How to Resolve the Vulnerability of Public Malware Sandbox Analysis Systems", Information Processing Society of Japan Report of Research, Japan, General Incorporated Foundation Information Processing Society, Apr. 15, 2011, p. 1-8.
Ichiro Kurima et al., "Method for Network Switching to Support Investigation of Malware with SDN", IPSJ SIG Technical Report, vol. 2014-SPT-10, No. 18, pp. 1 to 8, Jul. 3, 2014 (8 pages total).
Security Trend, Nikkei Communications, Aug. 1, 2014, No. 607, pp. 50-51 (2 pages total).
Online article, obtained from URL: http://businessnetwork.jp/Portals/0/SP/1408_watchguard_xtm/ (5 pages total), printed: Dec. 28, 2017.
International Search Report dated Jul. 12, 2016 issued by the International Searching Authority in international application No. PCT/JP2016/002846.
Japanese Office Action for JP Application No. 2017-524609 dated Jul. 21, 2020 with English Translation.

\* cited by examiner

Fig. 4

| ITEM NUMBER (401) | DETECTION CONTENTS (402) | CONFIGURATION CONTENTS (EMULATION SETTING) (403) |
|---|---|---|
| 10001 | NO NETWORK ACCESS | • REJECT ANY NETWORK ACCESS |
| 10002 | ACCESS TO LOCAL HOST OCCURS AT LEAST ONCE | • ALLOW ACCESS TO LOCAL HOST |
| 10003 | ACCESS TO INTERNAL NETWORK OCCURS AT LEAST ONCE | • BUILD INTERNAL NETWORK VIRTUALLY<br>• ALLOW SAMPLE TO ACCESS THE BUILT INTERNAL NETWORK |
| 10004 | ACCESS TO EXTERNAL NETWORK (EXTERNAL SITE) PROVIDED BY ATTACKER OCCURS AT LEAST ONCE | • ALLOW ACCESS TO EXTERNAL NETWORK (EXTERNAL SITE) PROVIDED BY ATTACKER VIA TOR |
| 10005 | ACCESS TO EXTERNAL NETWORK (EXTERNAL SITE) DIFFERENT FROM THAT PROVIDED BY ATTACKER OCCURS AT LEAST ONCE | • REJECT ACCESS TO EXTERNAL NETWORK (EXTERNAL SITE) OTHER THAN EXTERNAL NETWORK PROVIDED BY ATTACKER |
| ... | ... | ... |

NETWORK CONFIGURATION INFORMATION

Fig. 5

VIDEO CONFIGURATION INFORMATION

| ITEM NUMBER (501) | DETECTION CONTENTS (502) | CONFIGURATION CONTENTS (503) |
|---|---|---|
| 11001 | NO DIRECT ACCESS TO VIDEO CARD | • STANDARD SETTING (DEFAULT SETTING) |
| 11002 | DIRECT ACCESS TO VIDEO CARD OCCURS AT LEAST ONCE | • TRANSFER I/O PROCESS ON VIDEO BOARD PROVIDED BY VIRTUAL MACHINE, TO REAL VIDEO BOARD (IN REAL MACHINE) |
| ... | ... | ... |

Fig. 6

I/O PORT CONFIGURATION INFORMATION 603

| ITEM NUMBER 601 | DETECTION CONTENTS 602 | CONFIGURATION CONTENTS 603 |
|---|---|---|
| 12001 | NO DIRECT ACCESS TO I/O PORT | • STANDARD SETTING (DEFAULT SETTING) |
| 12002 | DIRECT ACCESS TO I/O PORT OCCURS AT LEAST ONCE | • CONCEAL SPECIFIC I/O PORT USED IN VIRTUAL MACHINE |
| ... | ... | ... |

Fig. 7

PROCESSOR CONFIGURATION INFORMATION

| ITEM NUMBER (701) | DETECTION CONTENTS (702) | CONFIGURATION CONTENTS (703) |
|---|---|---|
| 13001 | NO ACCESS TO PROCESSOR | • STANDARD SETTING (DEFAULT SETTING) |
| 13002 | ACCESS TO PROCESSOR OCCURS AT LEAST ONCE | • NOTIFY PROCESSOR INFORMATION ON REAL PROCESSOR (PROVIDED IN REAL MACHINE) |
| ... | ... | ... |

Fig. 8

FILE SYSTEM CONFIGURATION INFORMATION

| ITEM NUMBER 801 | DETECTION CONTENTS 802 | CONFIGURATION CONTENTS 803 |
|---|---|---|
| 14001 | NO ACCESS TO FOLDER | • STANDARD SETTING (DEFAULT SETTING) |
| 14002 | ACCESS TO FOLDER OCCURS AT LEAST ONCE | • CREATE FOLDER STRUCTURE IN VIRTUAL MACHINE, SIMILAR TO FOLDER STRUCTURE IN REAL OPERATING ENVIRONMENT, SO AS NOT TO INCLUDE CONFIDENTIAL INFORMATION |
| ... | ... | ... |

ANALYSIS SYSTEM, ANALYSIS METHOD, ANALYSIS DEVICE, AND STORAGE MEDIUM FOR ANALYZING OPERATION OF A PROGRAM EXECUTED IN AN ANALYSIS ENVIRONMENT

The present application is a Continuation application of Ser. No. 15/575,480 (which issued as U.S. Pat. No. 10,776, 486) filed on Nov. 20, 2017, which is a National Stage Entry of PCT/JP2016/002846 filed on Jun. 13, 2016, which claims priority from Japanese Patent Application 2015-120712 filed on Jun. 16, 2015, the contents of all of which are incorporated herein by reference, in their entirety.

TECHNICAL FIELD

The present invention relates to an analysis system and the like which analyze operation of a program (software program) to be analyzed, by executing the program in an analysis environment.

BACKGROUND ART

An issue of security threat caused by programs executing malicious processes in various kinds of information processing devices (for example, various computers, communication devices and the like) in operating environments (for example, various software programs such as malware) has been arisen in recent years. To deal with the issue, malware analysis has been carried out, for example, in organizations such as SOC (Security Operation Center) and CSIRT (Computer Security Incident Response Team).

Malware analysis tasks may include a task of sampling a record about calling of a system call, network access or the like, by executing the malware in an environment for analysis. Such an environment for analysis is desired not to prevent original operation of malware when sampling the record, and to be able to reduce various security threats (for example, an illegitimate access and the like) to an environment other than the environment for analysis. Hereafter, the environment for analysis may be referred to as a "protected environment", and an environment in which an information processing device or the like really operates may be referred to as a "real operating environment".

In many cases, the protected environment is built by use of a virtual machine using various virtualization platforms. The protected environment is not equal to the real operating environment itself. Accordingly, in many cases, the protected environment has a different feature from that of the real operating environment. There is malware which detects difference between the protected environment and the real operating environment from a feature of the protected environment and accordingly conceals original operation of the malware itself.

Technologies relating to analysis of an malicious program such as the above-described malware are disclosed, for example, in Patent Literature described below. Patent Literature 1 (PTL 1) discloses a technology of evaluating operation of an executable program by use of a protected execution environment (sandbox environment). The technology disclosed in PTL 1 selects one of a sandbox environment and a standard environment as an operating environment to operate a program, on the basis of a result of analyzing the program in real time.

Patent Literature 2 (PTL 2) discloses a technology which builds execution environments to execute malware to be analyzed, on the basis of demand for computer environments requested by users, and analyzes malware by selecting, among the built execution environments, an execution environment resembling a user's computer environment.

Patent Literature 3 (PTL 3) discloses a technology which collects information for building an operation environment to operate malware by analyzing shell cord for installing the malware and controls the malware to operate in the built operation environment, thereby analyzing the malware's operation.

Patent Literature 4 (PTL 4) discloses a technology of building a malware execution environment to execute malware and a virtual network environment which creates virtual communication data according to a protocol of communication performed by the malware and performs transmission and reception of the virtual communication data. This technology analyzes operation of malware which checks connection to a network, by executing the malware in the malware execution environment and returning the virtual communicated data to a communication process performed by the malware.

Patent Literature 5 (PTL 5) discloses a technology which analyzes operation of malware by using a log of the malware's execution in a terminal for malware execution disposed in an isolated environment and a log of the malware's communication to a dummy server.

Patent Literature 6 (PTL 6) discloses a technology of determining whether a program is malware or not by setting a breakpoint in the program and analyzing the program's operation at the breakpoint.

Further, in relation to management of various resources in virtual machines, Patent Literature 7 (PTL 7) discloses a technology which, in a virtual machine system using a plurality of physical resources, controls arrangement of virtual machines such that surplus amounts of the resources comply with a specific policy (surplus policy).

CITATION LIST

Patent Literature

[PTL 1] Japanese Laid-Open Patent Application No. 2014-238870
[PTL 2] Japanese Laid-Open Patent Application No. 2012-221170
[PTL 3] Japanese Laid-Open Patent Application No. 2011-013917
[PTL 4] Japanese Laid-Open Patent Application No. 2009-181335
[PTL 5] Japanese Laid-Open Patent Application No. 2007-334536
[PTL 6] International Patent Publication No. WO 2004/075060
[PTL 7] Japanese Laid-Open Patent Application No. 2010-146420

SUMMARY OF INVENTION

Technical Problem

As described above, when executed in a protected environment, recent malware may perform an operation different from its original operation. In this case, there is a problem that analysis of the malware is obstructed. However, in many cases, it is difficult to analyze malware by operating it in a real operating environment. The reason is that there is a possibility of security violation such as information leakage and attack to an external network caused by the unintended operation of the malware.

In this respect, the technology disclosed in PTL 1 does not sufficiently take into consideration a possibility that an executable program (for example, malware) detects a sandbox environment and accordingly changes operation. The technology disclosed in PTL 2 merely selects (provides) an execution environment expected to increase in demand, on the basis of users' computer environments collected in advance and vulnerability information on each resource. The technology disclosed in PTL 3 builds a malware execution environment based on a result of shell code analysis or the like, but there is a possibility that the malware detects that the execution environment is built in a protected environment. Each of the technologies disclosed in PTL 4 to PTL 6 is a technology of analyzing malware operation by notifying a dummy response to malware on the assumption that the malware performs a normal process. Accordingly, those technologies cannot satisfactorily analyze operation of malware which changes operation according to a result of detecting a protected environment.

The present invention has been achieved in consideration of the above-described circumstances. One of primary objectives of the present invention is to provide an analysis system capable of analyzing original operation of a program by building an appropriate analysis environment in accordance with the program's operation.

Solution to Problem

To achieve above mentioned objective, an analysis system according to one aspect of the present invention is configured as follows. That is, the analysis system according to one aspect of the present invention includes: an operation analysis means for analyzing operation of an analysis target program that is a program to be analyzed, by executing the analysis target program in a second execution environment capable of emulating at least a partial configuration of a first execution environment that is able to execute the analysis target program; and a configuration means for building the second execution environment capable of emulating a specific configuration of the first execution environment, the specific configuration being relevant to an operation of the analysis target program, by modifying at least a partial configuration of the second execution environment in accordance with the operation of the analysis target program analyzed by the operation analysis means.

An analysis method according to another aspect of the present invention includes following configurations. That is, the analysis method according to another aspect of the present invention includes: analyzing operation of an analysis target program that is a program to be analyzed, by executing the analysis target program in a second execution environment capable of emulating at least a partial configuration of a first execution environment that is able to execute the analysis target program; and building the second execution environment capable of emulating a specific configuration of the first execution environment, the specific configuration being relevant to the operation of the analysis target program, by modifying at least a partial configuration of the second execution environment in accordance with the operation of the analysis target program being analyzed.

An analysis apparatus according to yet another aspect of the present invention is configured as follows. That is, the analysis apparatus includes, as a single apparatus: an operation analysis means configured to analyze operation of an analysis target program that is a program to be analyzed, by executing the analysis target program in a second execution environment capable of emulating at least a partial configuration of a first execution environment that is able to execute the analysis target program; and a configuration means configured to build the second execution environment capable of emulating a specific configuration of the first execution environment, the specific configuration being relevant to an operation of the analysis target program analyzed in the operation analysis means, by modifying at least a partial configuration of the second execution environment in accordance with the operation of the analysis target program analyzed by the operation analysis means.

Further, the objective is achieved by a computer program for realizing an analysis system, an analysis apparatus and a corresponding analysis method having the respective configurations described above by means of a computer, and also achieved by a computer readable storage medium storing the computer program.

Advantageous Effects of Invention

According to the present invention, it is possible to analyze original operation of a program by building an appropriate analysis environment in accordance with the program's operation.

BRIEF DESCRIPTION OF DRAWINGS

FIG. 4 is a diagram showing a specific example of information used for configuring a virtual network to which a virtual machine according to the first example embodiment of the present invention is connected.

FIG. 5 is a diagram showing a specific example of information used for configuring a video board in the virtual machine according to the first example embodiment of the present invention.

FIG. 6 is a diagram showing a specific example of information used for configuring an I/O (Input and output) port in the virtual machine according to the first example embodiment of the present invention.

FIG. 7 is a diagram showing a specific example of information used for configuring processor information in the virtual machine according to the first example embodiment of the present invention.

FIG. 8 is a diagram showing a specific example of information used for configuring a file system in the virtual machine according to the first example embodiment of the present invention.

DESCRIPTION OF EMBODIMENTS

First Example Embodiment

Hereinafter, example embodiments of the present invention will be described in detail, with reference to drawings. Configurations described in the following example embodiments are just examples, and the technical scope of the present invention is not limited to them.

Analysis system described hereinafter may be realized by use of a single apparatus (physical or virtual machine). In this case, the analysis systems function as a single analysis apparatus. The analysis system may also be realized by use of a plurality of apparatuses (physical or virtual machines). In this case, a plurality of apparatuses constituting the analysis system may be communicatively connected with each other by a communication network (communication lines) which is wired network, wireless network or any combination of them. The communication network may be either a physical communication network or a virtual communication network.

[Description of Configuration]

Figure 1:
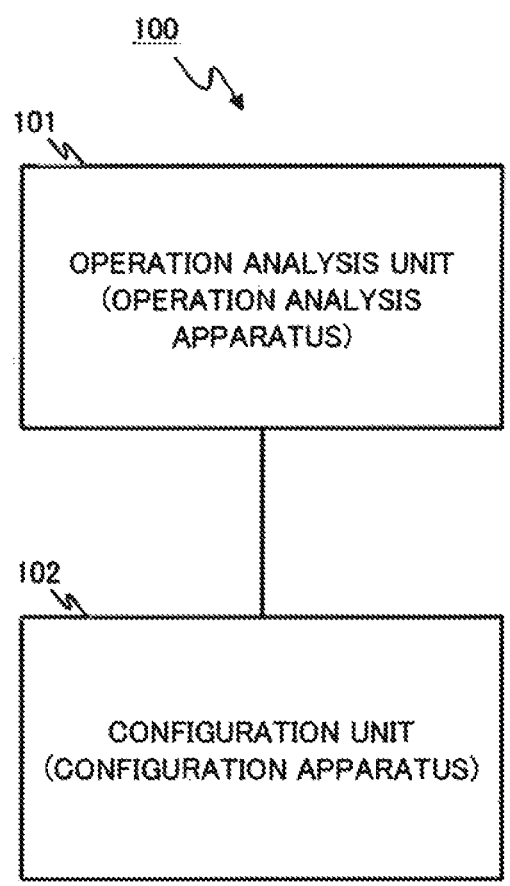
FIG. 1 is a block diagram illustrating a functional configuration of an analysis system in a first example embodiment of the present invention.

Hereinafter, a configuration of an analysis system in a first example embodiment will be described, with reference to FIG. 1. As illustrated in FIG. 1, the analysis system 100 in the first example embodiment includes an operation analysis unit 101 and a configuration unit 102. The operation analysis unit 101 may be realized as a single analysis apparatus, and the configuration unit 102 may be realized as a single configuration apparatus. The operation analysis unit 101 and the configuration unit 102 are communicatively connected with each other using any communication method (communication path).

The operation analysis unit 101 performs a process of analyzing operation of a program to be analyzed (analysis target program) such as malware, by executing the program in a virtual environment (corresponding to an emulation environment which will be described later). The analysis target program may be, for example, a program implemented in various forms such as any executable code, script, device driver and library. The analysis target program is configured to execute a detection operation for determining an execution environment in which the analysis target program itself is executed (hereafter, may be referred to as an "operating environment determination process"). The operating environment determination process may be, for example, either a process for determining whether the analysis target program itself is executed in a real operating environment or not, or a process for determining whether the analysis target program itself is executed in an emulation environment or not. As a specific example of the analysis target program, a case of analyzing malware will be described below.

Figure 2:
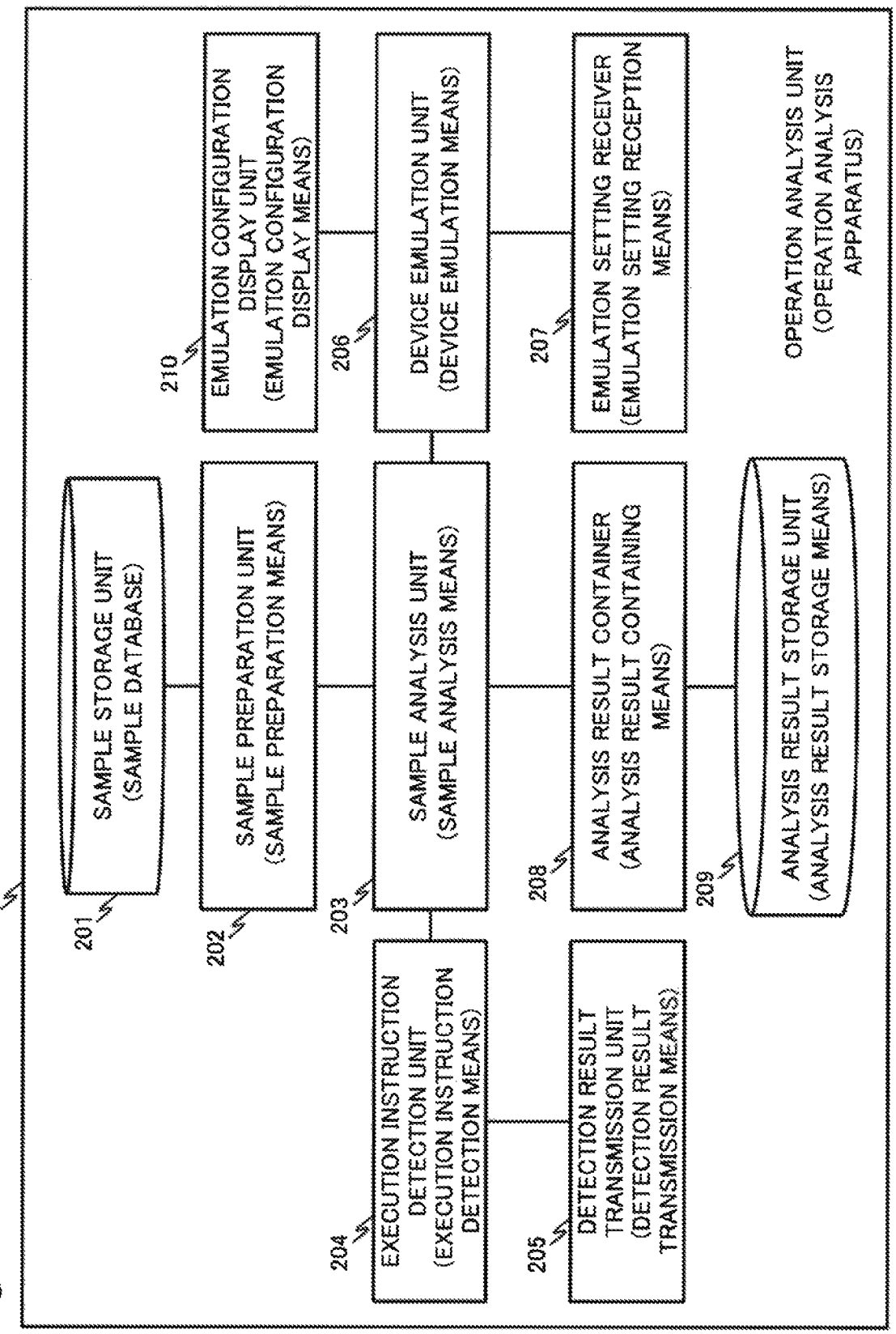
FIG. 2 is a block diagram illustrating a functional configuration of an operation analysis unit included in the analysis system in the first example embodiment of the present invention.

As illustrated in FIG. 2, the operation analysis unit 101 includes a sample storage unit 201, a sample preparation unit (sample preparation means) 202, a sample analysis unit (sample analysis means) 203, an execution instruction detection unit (execution instruction detection means) 204 and a detection result transmission unit (detection result transmission means) 205. The operation analysis unit 101 includes also a device emulation unit (device emulation means) 206, an emulation setting receiver (emulation setting reception means) 207, an analysis result container (analysis result containing means) 208 and an analysis result storage unit 209. The operation analysis unit 101 may further include an emulation configuration display unit (emulation configuration display means) 210.

Figure 3:
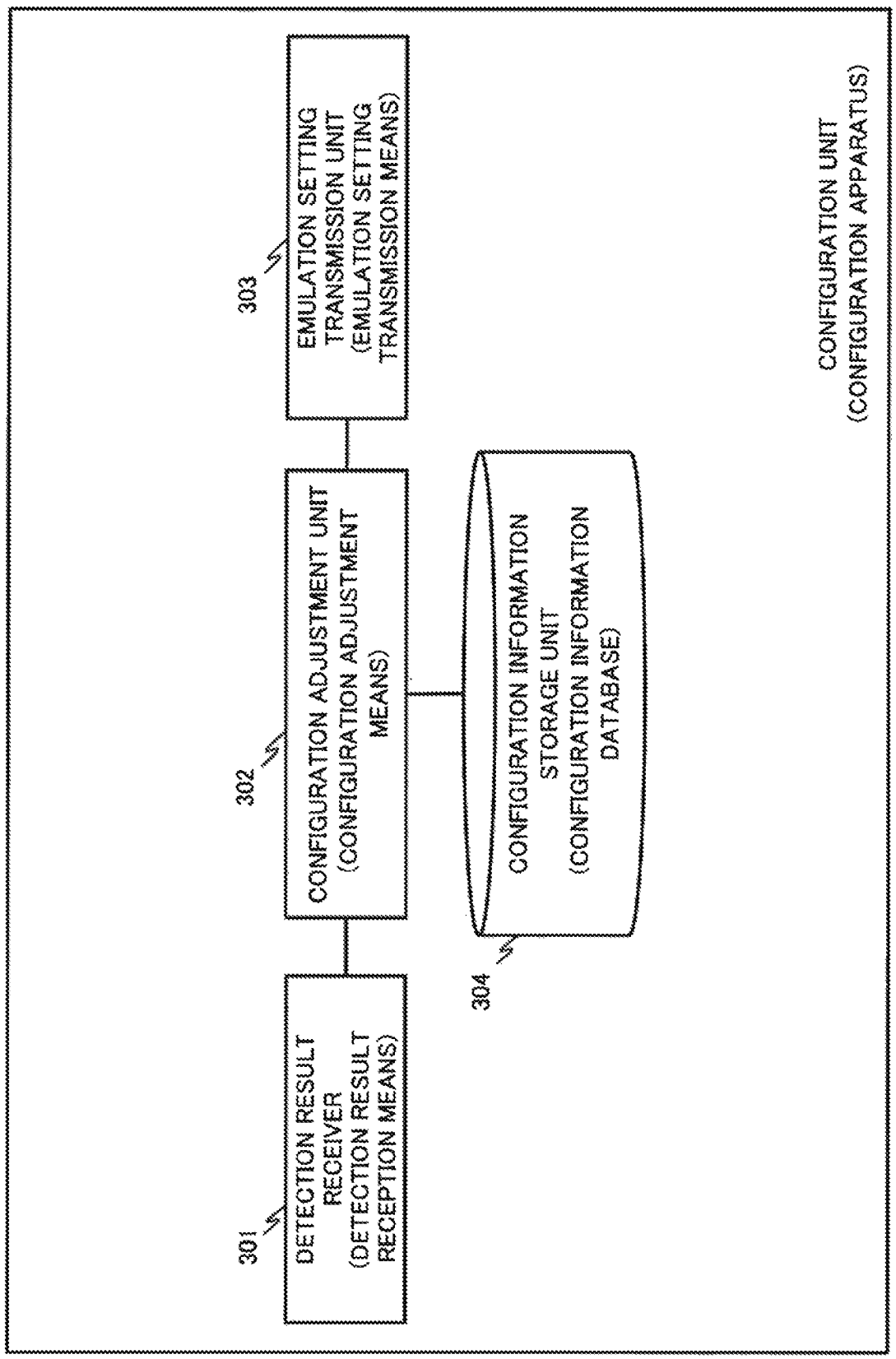
FIG. 3 is a block diagram illustrating a functional configuration of a configuration unit included in the analysis system in the first example embodiment of the present invention.

The configuration unit 102 builds a virtual environment for executing a program in the operation analysis unit 101, and executes processing of modifying (adjusting) configuration of the virtual environment in accordance with operation of the program. As illustrated in FIG. 3, the configuration unit 102 includes a detection result receiver (detection result reception means) 301, a configuration adjustment unit (configuration adjustment means) 302, an emulation setting transmission unit (emulation setting transmission means) 303 and a configuration information storage unit 304. The above-noted constituent elements will be described below.

The sample storage unit 201 is a data storage means capable of recording malware collected in advance (hereafter, may be referred to as a "sample"). The sample storage unit 201 may be realized using, for example, a database, a file system or the like which can store executable data (an executable file and the like) for malware.

The sample preparation unit 202 extracts (selects) a malware sample from the sample storage unit 201 and provides it for the sample analysis unit 203. Specifically, for example, the sample preparation unit 202 may search for a malware sample to be analyzed in a database of the sample storage unit 201, and may provide the retrieved malware sample for the sample analysis unit 203.

The sample analysis unit 203 executes the malware sample in an emulation environment which will be described later. Specifically, for example, the sample analysis unit 203 may execute the malware sample in a virtual machine under an emulation environment which is set by the device emulation unit 206 described later, as a new process. The sample analysis unit 203 may properly select an appropriate execution method in accordance with the malware's implementation form (an executable file or a scripts, a library, a device driver and the like). The sample analysis unit 203 may collect any information used for the malware analysis and produce an analysis result on the basis of the information.

The execution instruction detection unit 204 detects operation performed by the malware sample (hereafter, may be referred to as simply "malware operation"). Specifically, for example, the execution instruction detection unit 204 extracts an execution instruction the sample attempts to execute and data used in executing the execution instruction, and handle them as a detection result. The execution instruction may be, for example, operation code executed by the sample, and the data used in executing the execution instruction may be, for example, an argument to the operation code. The execution instruction is not limited to the above-described one, but may also be, for example, calling of various system calls, an API (Application Programming Interface), a function and the like.

The execution instruction detection unit 204 can acquire (trap) an execution instruction executed in a virtual machine, using a function of a virtualization platform for providing a virtual machine for executing a sample. For example, the execution instruction detection unit 204 may transfer some of trapped instructions to an information processing device (for example, a physical computer or the like) in which the virtual machine is operated, and may perform a specific process on the other instructions. In each virtualization platform (VMware (registered trademark) or Hyper-V (registered trademark)), a function to acquire (trap) an execution instruction (for example, operation code) executed by a virtual machine is provided, and the execution instruction detection unit 204 may use the function.

The detection result transmission unit 205 transmits the above-described detection result acquired by the execution instruction detection unit 204 to the detection result receiver 301 which will be described later, using any communication means (a wired or wireless communication line, or an electrical line similar to that).

The device emulation unit 206 builds an emulation environment (may be referred to also as a "second execution environment") which the sample analysis unit 203 uses when executing a sample. Further, the device emulation unit 206 modifies a configuration of the emulation environment in accordance with an instruction from the configuration unit 102 which will be described later.

The emulation environment corresponds to the protected environment described above and includes at least a virtual machine capable of emulating at least a partial configuration (constituent elements) of the real operating environment (may be referred to also as a "first execution environment"). The emulation environment may be configured with one or more virtual machines and a virtualization platform (virtualization middleware or the like) for providing the virtual machine. In this case, the emulating a configuration of the real operating environment represents configuring the emulation environment (particularly, the virtual machine) to realize functions equivalent or approximately equivalent to those of constituent elements constituting the real operating environment.

The device emulation unit 206 may change a configuration of the emulation environment, for example, by dynamically modifying a configuration of the virtual machine to emulate the real operating environment. Specifically, the device emulation unit 206 may change a configuration of the emulation environment by dynamically modifying a configuration of the virtual machine on the basis of emulation setting information received by the emulation setting receiver 207 (described later).

The virtual machine is, for example, a virtual information processing device provided in a virtualization platform, and includes constituent elements such as a communication means (means for connecting to a communication network), a video card, an I/O (Input and output) port, a CPU and a file system. For example, the constituent elements constituting the virtual machine may be able to provide functions equivalent or approximately equivalent to those of constituent elements constituting an information processing device or the like in the real operating environment. The virtual machine can be realized using, for example, various virtualization platforms (for example, VMware (registered trademark), Hyper-V (registered trademark) and the like).

The emulation setting information is information for setting the constituent elements of the virtual machine so as to emulate a configuration of the real operating environment. In the present example embodiment, the virtual machine being set up by use of the emulation setting information is configured to notify a malware of an execution result as described below, when the malware has performed an operating environment determination process in the virtual machine. That is, the virtual machine being set up by use of the emulation setting information is configured such that it notifies to malware an execution result equivalent or approximately equivalent to a result which is obtained when the malware performs the operating environment determination process in the real operating environment. In other words, the emulation setting information is information for configuring the emulation environment (more specifically, the virtual machine) such that a result of the operating environment determination process executed by certain malware in the virtual machine becomes equivalent or approximately equivalent to a result of the the operating environment determination process executed by the malware in the real operating environment.

When malware is executed in the virtual machine which is set up by use of the emulation setting information, the malware cannot determine that an environment in which the malware itself is being executed is the emulation environment. It is because, to the operating environment determination process performed by the malware, a response equivalent or approximately equivalent to that from the real operating environment is notified from the emulation environment (more specifically, the virtual machine).

The emulation setting information may also be, for example, information enabling to configure the emulation environment such that a second execution result on a certain malware operation includes dummy information capable of emulating (imitating) a first execution result on the malware operation. The dummy information may also be, for example, information obtained by concealing, deleting or manipulating information which should not be notified to the malware (confidential information and the like) from the first execution result. Further, the dummy information may also be information to camouflage the configuration (constituent elements) of the emulation environment from the malware. Specifically, for example, the dummy information may be information representing a disguised virtual network configuration or information representing a disguised virtual hardware configuration.

When malware is executed in a virtual machine which is set up by use of the emulation setting information, the malware cannot recognize that an environment in which the malware itself is being executed is the emulation environment. It is because, to the operating environment determination process performed by the malware, a response equivalent or approximately equivalent to that from the real operating environment is notified from the emulation environment (more specifically, the virtual machine).

The emulation setting receiver 207 receives the emulation setting information from the emulation setting transmission unit 303 which will be described later, using any communication means (a wired or wireless communication line, or an electrical line similar to that) The emulation setting receiver 207 outputs the received emulation setting information to the device emulation unit 206.

The analysis result container 208 outputs a result of malware execution by the sample analysis unit 203 to the analysis result storage unit 209, as an analysis result regarding the malware sample. For example, the analysis result of the sample may include a detection result detected by the execution instruction detection unit 204. The analysis result of the sample is not limited by the above description, but may include any information analyzed by the sample analysis unit 203 during executing the sample.

The analysis result storage unit 209 is a data storage means capable of recording a plurality of analysis results of sample described above. The analysis result storage unit 209 may be implemented, for example, using a database, a file system or the like which is capable of storing data on the analysis results.

The emulation configuration display unit 210 outputs a configuration of the emulation environment built by the device emulation unit 206 to any display means. Specifically, for example, the emulation configuration display unit 210 may display a configuration (constituent elements) of the virtual machine on a display screen in a display device or the like.

Next, constituent elements of the configuration unit 102 will be described. The detection result receiver 301 receives a detection result detected in the execution instruction detection unit 204, from the detection result transmission unit 205. The detection result receiver 301 outputs the received detection result to the configuration adjustment unit 302.

Using the detection result received as input from the detection result receiver 301, the configuration adjustment unit 302 searches for emulation setting information stored in the configuration information storage unit 304 which will be described later. The emulation setting information is information enabling to set a configuration of the virtual machine, as described above. Specifically, for example, the configuration adjustment unit 302 searches for, by using the detection result as a key, appropriate emulation setting information associated with the search result in the configuration information storage unit 304, and outputs the search result to the emulation setting transmission unit 303.

The emulation setting transmission unit 303 transmits the emulation setting information received from the configuration adjustment unit 302, to the emulation setting receiver 207, using any communication means.

The configuration information storage unit 304 is a data storage means for storing the above-described detection result and emulation setting information by associating them with each other. Specifically, the configuration information storage unit 304 may be implemented, for example, using a database including the detection result as a key and including data representing the emulation setting information as a value.

In the present exemplary embodiment, predetermined emulation setting information may be registered in advance, with respect to certain malware operation, in the configuration information storage unit 304. In this case, for example, a user (or an administrator) of the analysis system 100 may create appropriate emulation setting information in advance with respect to known malware operation and predictable malware operation, and register the emulation setting information into the configuration information storage unit. Malware operation to be registered in advance may be extracted on the basis of known vulnerability information, known malware information, information about security violation incidents and the like. Further, in the present example embodiment, emulation setting information registered in the configuration information storage unit may be appropriately appended or updated according to a result of analysis of malware operation by the analysis system 100. In specific examples described below, the configuration information storage unit 304 stores emulation setting information illustrated in FIGS. 4, 5, 6, 7 and 8, respectively.

The above-described configuration of the analysis system 100 is just an example, and a configuration capable of implementing the analysis system 100 is not limited by the above description. For example, each of the constituent elements constituting the operation analysis unit 101 or the configuration unit 102 may be integrated with other ones of the constituent elements. Alternatively, the constituent elements may each be split into constituent elements of finer granularity.

[Description of Operation]

Figure 9:
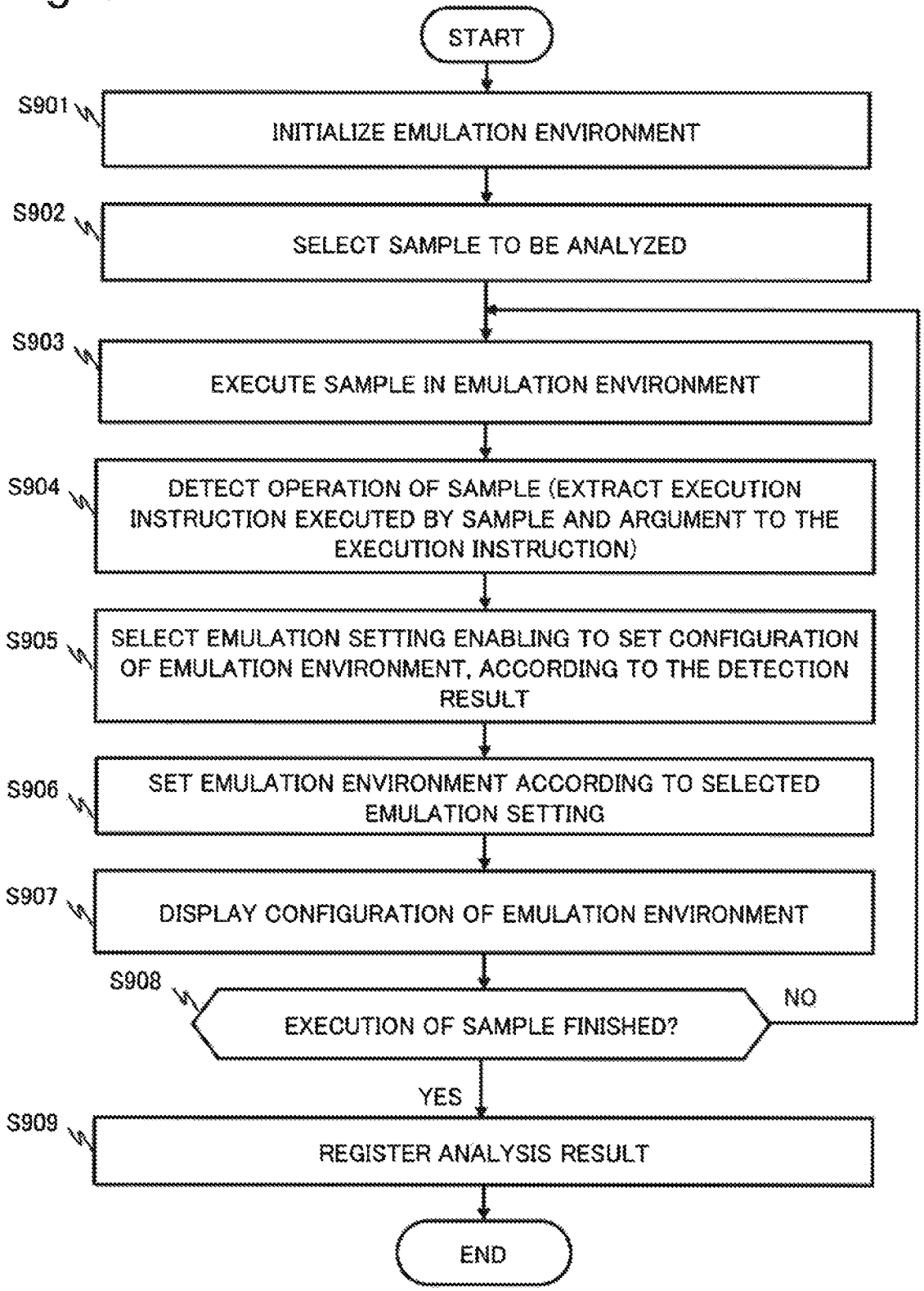
FIG. 9 is a flow chart illustrating operation of the analysis system in the first example embodiment of the present invention.

Operation of the analysis system 100 in the present exemplary embodiment will be described, using a flow chart illustrated in FIG. 9.

First, the operation analysis unit 101 initializes an emulation environment, as an initialization process (step S901). Specifically, the device emulation unit 206 initializes a virtual machine constituting the emulation environment and sets up the virtual machine to realize minimum emulation of a real operating environment. The device emulation unit 206 may either build a new virtual machine or change the setting of an already-existing virtual machine.

Next, the sample preparation unit 202 acquires (selects) a malware sample to be analyzed from the sample storage unit 201 and outputs it to the sample analysis unit 203 (step S902). For example, the sample preparation unit 202 may retrieve, from a database constituting the sample storage unit 201, a malware sample to be analyzed which is designated by a user (not illustrated) of the present system, and may output the retrieved sample to the sample analysis unit 203.

Next, the sample analysis unit 203 executes the sample selected in the step S902, in the emulation environment initialized in the step S901 (step S903). Specifically, the sample analysis unit 203 may control the virtual machine to execute the sample. When starting the sample, for example, the sample analysis unit 203 may install the sample into the virtual machine and execute the sample as a process in the virtual machine.

After the sample is e in the step S903, the execution instruction detection unit 204 extracts an instruction executed by the sample (execution instruction) and data (an argument) used for the execution instruction (step S904). Specifically, for example, the execution instruction detection unit 204 extracts operation code of the execution instruction executed by the sample and the argument to the execution instruction. In this way, the execution instruction detection unit 204 detects an operation performed by the malware sample. The execution instruction detection unit 204 outputs the extracted execution instruction and argument to the detection result transmission unit 205, as a detection result. When the malware operation is detected by the execution instruction detection unit 204, the sample analysis unit 203 may temporarily suspend the malware execution.

The detection result transmission unit 205 transmits the detection result outputted from the execution instruction detection unit 204, to the detection result receiver 301 in the configuration unit 102. The detection result receiver 301 outputs the detection result received from the detection result transmission unit 205, to the configuration adjustment unit 302.

Next, using the detection result received from the detection result receiver 301, the configuration adjustment unit 302 acquires (selects) emulation setting information from the configuration information storage unit 304 (step S905). For example, the configuration adjustment unit 302 may acquire emulation setting information associated with the detection result by searching a database constituting the configuration information storage unit 304, using the operation code and argument of an execution instruction included in the detection result as a key. In this way, the configuration adjustment unit 302 can appropriately select emulation setting information representing a configuration of the virtual machine, in accordance with a sample operation.

The configuration adjustment unit 302 outputs the search result (emulation setting information) to the emulation setting transmission unit 303. The emulation setting transmission unit 303 transmits the emulation setting information received from the configuration adjustment unit 302, to the emulation setting receiver 207 in the operation analysis unit 101. The emulation setting receiver 207 outputs the received emulation setting information to the device emulation unit 206.

In accordance with the received emulation setting information, the device emulation unit 206 modifies a configuration of the emulation environment (step S906). Specifically, the device emulation unit 206 modifies a configuration of the virtual machine in the emulation environment in accordance with the emulation setting information. In this way, a configuration of the emulation environment used by the sample analysis unit 203 when analyzing a sample is modified. For example, when an operating environment determination process performed by malware is detected as a result of the step S904, a configuration of the emulation environment is modified in the step S906 using emulation setting information associated with the detection result. As a result, a response equivalent or approximately equivalent to that from the real operating environment, for example, is notified from the emulation environment (particularly, the virtual machine) to the malware having performed the operating environment determination process. Accordingly, the malware cannot determine that the malware itself is being executed in the emulation environment. As a result, the malware performs its original process without concealing the process. That is, from the process, the analysis system 100 in the present example embodiment can analyze the malware, without causing the malware to be aware of that the malware itself is being analyzed in the emulation environment.

In a case where the malware execution was temporarily suspended in the step S904, the sample analysis unit 203 may restart the malware execution after the configuration change in the device emulation unit 206 is completed.

Figure 10:
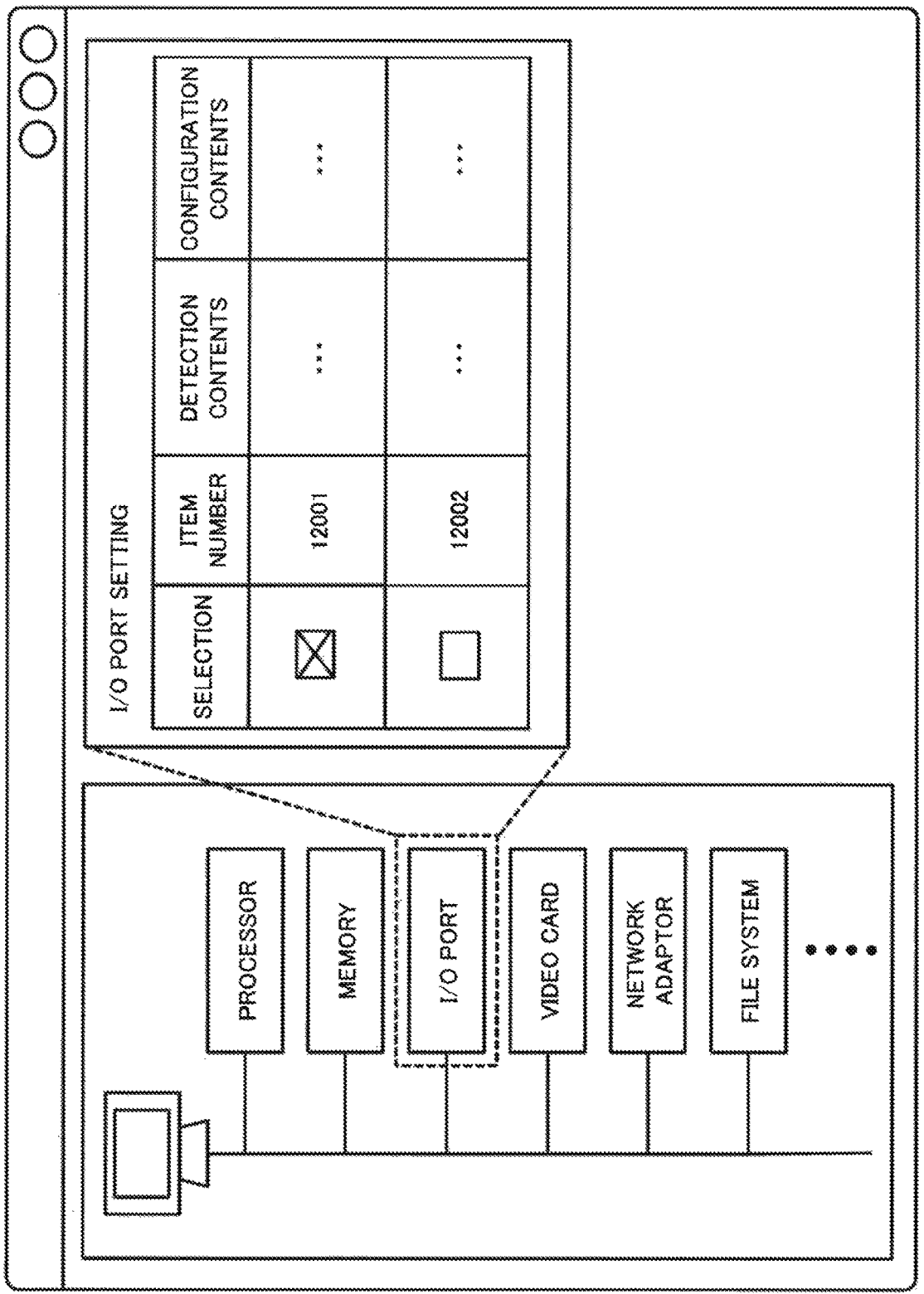
FIG. 10 is a diagram showing a specific example of a display screen for displaying a configuration of the virtual machine in the first example embodiment of the present invention.

Next, the emulation configuration display unit 210 displays the configuration of the emulation environment on a display screen (step S907). The emulation configuration display unit 210 may automatically display a modified configuration in the emulation environment (or the virtual machine), for example, using a display screen illustrated in FIG. 10. For example, the emulation configuration display unit 210 may highlight the modified configuration in the emulation environment (or the virtual machine). A method of displaying a configuration of the emulation environment in the present example embodiment is not limited to the specific example illustrated in FIG. 10. The emulation configuration display unit 210 may properly display a configuration of the emulation environment by means of an appropriate method.

Next, the sample analysis unit 203 determines whether execution of the sample in the emulation environment has been finished. If execution of the sample has been finished (that is, all execution instructions have been executed) (YES in a step S908), the sample analysis unit 203 outputs an analysis result on the sample to the analysis result container 208. In this case, the analysis result container 208 stores (registers) the analysis result into the analysis result storage unit 209 (step S909).

In the step S908, if execution of the sample has not been finished (NO in the step S908), the sample analysis unit 203 returns to the step S903 and continues the process. In this way, the sample analysis unit 203 continues the process described above until all execution instructions implemented in the sample are executed.

The analysis system 100 configured as described above in the present example embodiment can analyze malware, without causing the malware to be aware of that the malware itself is being analyzed in an emulation environment. It is because, in the analysis system 100, to a specific operation performed by malware (for example, the operating environment determination process), a response which is able to emulate the real operating environment is returned from the emulation environment. That is, in the present example embodiment, the device emulation unit 206 builds an emulation environment emulating the real operating environment in accordance with malware operation. Accordingly, the malware cannot recognize that the malware is being executed in an emulation environment (environment for analysis). Accordingly, the malware performs its original operation without concealing the operation and, as a result, it becomes possible for the analysis system 100 in the present example embodiment to analyze the malware's original function without causing any influence on the malware's operation.

Further, the analysis system 100 in the present example embodiment properly sets (modifies) a configuration of the emulation environment, on the basis of an emulation setting selected by the configuration adjustment unit 302 in accordance with a malware operation. As described above, the emulation environment (virtual machine) in the present example embodiment is initialized, for example, such that it realizes minimum emulation of the real operating environment. Then, in the emulation environment, a setting of the constituent elements necessary to return an appropriate execution result to a malware operation (for example, the operating environment determination process) is modified on the basis of an emulation setting. With this configuration, analysis system 100 is possible to limit constituent elements of the emulation environment which are to be set to emulate the real operating environment, to only constituent elements detected by malware in the environment determination process performed by the malware. As a result, the analysis system 100 can reduce a processing load on the emulation environment (particularly, the virtual machine) and improve the execution speed. Because, if the number of constituent elements set to emulate the real operating environment in the emulation environment increases, the amount of processing for emulating the real operating environment increases and a larger amount of calculation resources are required. By appropriately limiting the constituent elements to be set to emulate the real operating environment in the emulation environment, the analysis system 100 enables to reduce the amount of calculation resources associated with the process for emulating the real operating environment.

As has been described above, according to the analysis system 100 in the present example embodiment, it is possible to analyze original operation of programs such as malware and the like, by building an appropriate analysis environment in accordance with operation of the programs.

Hereinafter, specific operation of the analysis system according to the present example embodiment will be described, using specific examples.

First Specific Example

Hereinafter, as a first specific example of the present example embodiment, a description will be given of a case where a network configuration of the emulation environment is set (modified) in accordance with operation of malware to be analyzed. In this case, for example, network configuration information illustrated in FIG. 4 is registered in the configuration information storage unit 304. In the network configuration information illustrated in FIG. 4, combinations of a detection result of detecting malware operation (detection contents 402) and emulation setting information (configuration contents 403) associated with the detection result are included as items. As illustrated in FIG. 4, the network configuration information may include also item numbers 401 identifying the combinations of detection contents 402 and configuration contents 403.

Operation of the analysis system 100 in the present specific example will be described below. As already described, when a user (not illustrated in the drawings) of the analysis system 100 starts a malware analysis, the operation analysis unit 101 performs an initialization process (step S901) and sets up the device emulation unit 206 to perform minimum emulation of the real operating environment. The user extracts a malware sample from the sample storage unit 201 and controls the sample preparation unit 202 to prepare for executing the sample (step S902). The sample analysis unit 203 starts the selected sample (step S903), and the execution instruction detection unit 204 extracts operation code and an argument of an instruction executed by the sample (step S904). The extracted operation code and argument are transmitted, as a detection result, to the configuration adjustment unit 302 via the detection result transmission unit 205 and the detection result receiver 301 of the configuration unit 102.

In the present specific example, it is assumed, for example, that the malware sample determines whether the malware sample itself is executed in the real operating environment or not based on a result determined by the malware sample itself whether access to inside an intranet is possible or not. The intranet is, for example, an internal network which is built using an internal LAN (Local Area Network) or the like. A specific address range may be assigned to the internal network. The internal network may be, for example, an IP (Internet Protocol) network, and the address range may be, for example, a range of private addresses in the IP network.

In the above-described case, for example, the execution instruction detection unit 204 detects a process of accessing into the intranet, as the malware's operation. In this case, as operation code, "access to network" (for example, operation code for performing a system call used for a network connection process, and the like) is detected and, as an argument to the operation code, "IP address within intranet" is detected.

Taking the detection result as a key, the configuration adjustment unit 302 refers to (searches) the configuration information storage unit 304. As illustrated in FIG. 4, in the configuration information storage unit 304, "access to internal network occurs at least once" (an item whose item number 401 is "10003") is registered as detection contents 402. Accordingly, the configuration adjustment unit 302 acquires configuration contents 403 associated with the detection contents 402. As illustrated in FIG. 4, configuration contents 403 includes a setting "build internal network virtually" and a setting "allow sample to access the built internal network". The configuration adjustment unit 302 selects configuration contents 403 and outputs it to the emulation setting transmission unit 303 as emulation setting information (step S905). The emulation setting information is transmitted from the emulation setting transmission unit 303 to the device emulation unit 206 via the emulation setting receiver 207.

The device emulation unit 206 modifies the emulation environment to be in accordance with the emulation setting information (step S906). For example, on the basis of the emulation setting information, the device emulation unit 206 sets a configuration of a virtual network to which the virtual machine is connected. Specifically, the device emulation unit 206 builds a virtual IP network as the virtual network to which the virtual machine is connected, and assigns a specific IP address range (for example, a range of private addresses) to the IP network. Then, the device emulation unit 206 sets the virtual network (or virtual communication equipment in the virtual network) to allow access from the virtual machine to the virtual internal network built as above. The building and setting of the virtual network can be realized, for example, using a function provided in advance in each of virtualization platforms for providing a virtual machine (for example, VMware (registered trademark), Hyper-V (registered trademark) and the like). The modified virtual machine configuration is displayed by the emulation configuration display unit 210, and the user thereby can check the configuration.

As a result of the process performed by the device emulation unit 206, when the sample analysis unit 203 executes a sample, access to the internal network by the sample is processed as access to the virtual internal network. Then, the virtual machine notifies (returns) the sample of an execution result that is obtained when the access to the virtual internal network is allowed.

The above-described process is repeated until the execution of the malware sample is finished. The sample analysis unit 203 stores a result of the sample analysis into the analysis result storage unit 209, using the analysis result container 208. For example, extracting it from the analysis result storage unit 209, the user checks the analysis result of the sample.

Also for other items set in the network configurations illustrated in FIG. 4 whose item numbers are different from "10003", the analysis system 100 performs a similar process to the above-described one. For example, when a detected malware operation corresponds to detection contents 402 of the item "10002", the malware accesses the local host. In this case, based on configuration contents 403 of the item "10002", the device emulation unit 206 sets the virtual machine to allow access to the local host.

For example, when a detected malware operation corresponds to detection contents 402 of the item "10004", the malware accesses an external network (external site) provided by an attacker. The external network provided by an attacker may also be, for example, a server (for example, a bot control server) provided by an attacker and located in an external network, or a jump server controlled by an attacker. Further, the external network provided by an attacker may also be, for example, a network for attack (for example, a botnet or the like). In this case, in accordance with configuration contents 403, the device emulation unit 206 sets the emulation environment to allow access to the external network provided by an attacker. Specifically, for example, the device emulation unit 206 may set the emulation environment to allow access to the external network via a specific communication path capable of concealing a connection origin (for example, a communication path by TOR (The Onion Router)). In this way, the analysis system 100 can analyze operation of malware which checks connecting to a specific network for attack.

In the present specific example, information identifying an external network provided by an attacker (for example, a connection destination address, a port number used for communication, a pattern of communication data or the like) may be registered in the analysis system 100 in advance. The information may be stored, for example, in the configuration information storage unit 304. The information identifying an external network provided by an attacker may be extracted, for example, on the basis of known vulnerability information, known malware information, information about security incidents, and the like. Further, based on a result of its analyzing a sample, the analysis system 100 may register a new network as an external network provided by an attacker or update information on an already registered network.

When a detected malware operation corresponds to item "10005" in detection contents 402, the malware accesses an external network different from an external network provided by an attacker. In this case, in accordance with corresponding configuration contents 403, the device emulation unit 206 sets the emulation environment to reject access to such an external network different from an external network provided by an attacker. In this way, the analysis system 100 can interrupt the malware's attack against an un-violated external network. Not limited by the above description, the device emulation unit 206 may also set the emulation environment, for example, to modify communication data transmitted to and received from an external network.

The analysis system 100 may set a virtual network in the emulation environment taking configuration contents 403 of the item "10001" as a standard (default) network configuration. In this case, because the malware sample does not access to network, the device emulation unit 206 sets a virtual network in the emulation environment to reject any network access from the virtual machine. In that state, there is no need for building a virtual network capable of emulating the real operating environment and, accordingly, the device emulation unit 206 can reduce a processing load necessary for emulating the real operating environment.

The analysis system 100 configured as described above can appropriately change a setting of the emulation environment in accordance with a process of accessing a communication network performed by malware. As a result, the analysis system 100 can appropriately analyze malware which determines whether in the real operating environment or not according to a result of its process of accessing a specific network.

Second Specific Example

Hereinafter, a second specific example of the present example embodiment will be described. The analysis system 100 in the present specific example can notify an appropriate response emulating the real operating environment, to an operating environment determination process performed by malware using a graphics processing device (a video card or the like). In this case, in the configuration information storage unit 304, for example, video configuration information illustrated in FIG. 5 is registered. In the video configuration information illustrated in FIG. 5, combinations of a detection result of detecting malware operation (detection contents 502) and emulation setting information associated with the detection result (configuration contents 503) are included as items. As illustrated in FIG. 5, the video configuration information may include also item numbers 501 identifying the combinations of detection contents 502 and configuration contents 503.

The analysis system 100 (particularly, the device emulation unit 206) in the present specific example modifies a setting about a virtual graphics processing device (a video card or the like) in the virtual machine, in accordance with emulation setting information. The analysis system 100 may also change operation of the virtual machine for when malware has accessed the virtual graphics processing device, in accordance with emulation setting information. By the change, the device emulation unit 206 enables the virtual machine to notify an execution result as described below, to malware having performed an operating environment determination process using the virtual graphics processing device. That is, the virtual machine notifies, to the malware, an execution result emulating a result of when the operating environment determination process is performed using a physical graphics processing device. More specifically, the virtual machine may notify, to the malware, an execution result equivalent or approximately equivalent to a result of when the operating environment determination process is performed on the physical graphics processing device.

Hereinafter, operation of the analysis system 100 in the present specific example will be described. Operation of the analysis system 100 in the present specific example is similar to that of the first specific example described above except the steps S905 and S906 and, accordingly, its detailed description will be omitted here.

Assuming a case where the execution instruction detection unit 204 has detected direct access to a graphics processing device (video card) as a malware operation. In this case, the execution instruction detection unit 204 detects, for example, operation code for calling a specific function (for example, a three-dimensional drawing instruction, a general operation instruction or the like) provided by a GPU (Graphics Processing Units) constituting the video card, and also an argument to the operation code.

As illustrated in FIG. 5, in the configuration information storage unit 304, "direct access to video card occurs at least once" (an item whose item number 501 is "11002") is registered as detection contents 502. Accordingly, the configuration adjustment unit 302 acquires configuration contents 503 associated with the detection contents 502. As illustrated in FIG. 5, configuration contents 503 includes a setting "transfer I/O process on video board provided by virtual machine, to real video board (in real machine)". The configuration adjustment unit 302 selects configuration contents 503 and outputs it to the emulation setting transmission unit 303 as emulation setting information (step S905). The emulation setting information is transmitted from the emulation setting transmission unit 303 to the device emulation unit 206 via the emulation setting receiver 207.

The device emulation unit 206 modifies the emulation environment in accordance with the emulation setting information (step S906). In this case, the device emulation unit 206 may change a setting of the virtual graphics processing device (video card) included in the virtual machine. Specifically, for example, the device emulation unit 206 changes a setting of the video card in the virtual machine such that a process of accessing (an I/O process on) the video card of the virtual machine is transferred to the video card provided in the real machine (a physical information processing device or the like) in which the virtual machine operates. The transfer of access process can be realized using a function provided in advance in each of virtualization platforms for providing a virtual machine (for example, PCIe (Peripheral Component Interconnect Express) pass-through, PCI pass-through or the like).

As a result of the process performed by the device emulation unit 206, access to the video card by the malware sample executed by the sample analysis unit 203 is transferred to the video card provided in the real machine in which the virtual machine operates. Then, the virtual machine notifies (returns) a result of processing by the video card provided in the real machine, to the sample. In this way, the analysis system 100 can appropriately analyze malware which determines a real operating environment according to the existence or a function of a graphics processing device such as a video card.

A setting (emulation setting) registered in configuration contents 503 is not limited to the above-described one. For example, a setting of selecting between a video card compatible with the standard VGA (Video Graphics Array) and a virtual video card compatible with three-dimensional graphics may be registered in configuration contents 503. In this case, the device emulation unit 206 can initialize the virtual machine to include a video card compatible with the standard VGA and, in accordance with a malware operation, change the virtual machine configuration to include a virtual video card compatible with three-dimensional graphics. The configuration change in terms of a video card can be realized, for example, using a function of a virtualization platform providing the virtual machine.

Also for any item whose item number 501 is different from "11002" set in the video configuration information illustrated in FIG. 5, the analysis system 100 performs a process similar to the above-described one.

The analysis system 100 may set the virtual machine by use of configuration contents 503 of the item "11001" as a standard video card configuration. In this case, there occurs no direct access to a video card by the malware sample and, accordingly, the device emulation unit 206 sets a video card of the virtual machine using a standard setting (for example, a video card setting compatible with the standard VGA). In that state, it is not necessary for the virtual machine to emulate a graphics process in the real operating environment which requires a high processing load. As a result, the device emulation unit 206 can reduce a processing load on the virtual machine required for emulating the real operating environment.

Third Specific Example

Hereinafter, a third specific example of the present example embodiment will be described. The analysis system 100 in the present specific example can notify an appropriate response emulating the real operating environment, to an operating environment determination process performed by malware, using an input and output port (I/O port). In this case, in the configuration information storage unit 304, for example, I/O port configuration information illustrated in FIG. 6 is registered. In the I/O port configuration information illustrated in FIG. 6, similarly to the specific examples already described above, combinations of a detection result of detecting malware operation (detection contents 602) and emulation setting information associated with the detection result (configuration contents 603) are included as items As illustrated in FIG. 6, the I/O port configuration information may also include item numbers 601 identifying the combinations of detection contents 602 and configuration contents 603.

For example, the analysis system 100 (particularly, the device emulation unit 206) in the present specific example modifies a setting about a virtual I/O port in the virtual machine, on the basis of the emulation setting information. The analysis system 100 may also change, for example, operation of the virtual machine for when malware has accessed the virtual I/O port, on the basis of the emulation setting information.

By the change, for example, the device emulation unit 206 enables the virtual machine to notify an execution result as described below, to malware having performed an operating environment determination process on the virtual I/O port. That is the virtual machine notifies the malware of an execution result emulating a result that is obtained when the operating environment determination process is performed on a physical I/O port. More specifically, by the change, the virtual machine may notify the malware of an execution result equivalent or approximately equivalent to that of when the operating environment determination process is performed on the physical I/O port.

Operation of the analysis system 100 in the present specific example is similar to that in the specific examples already described above and, accordingly omitting its detailed description, only operation of the device emulation unit 206 will be described below.

For example, when a detected malware operation corresponds to detection contents 602 of an item "12002", the sample directly accesses an I/O port. In this case, in accordance with configuration contents 603 of the item "12002", the device emulation unit 206 sets the virtual machine to conceal a specific I/O port used by the virtual machine. The I/O port to be concealed may be, for example, an I/O port specific to a particular virtual machine (for example, a backdoor I/O port for connecting to the virtual machine) and the like. When the device emulation unit 206 conceals the I/O port, the malware sample cannot detect that the sample itself is being executed in the virtual machine. In this way, the analysis system 100 can appropriately analyze malware which determines whether in the real operating environment or not according to a process of accessing a specific I/O port.

The configuration contents 603 is not limited to the above-described one. In configuration contents 603, for example, a setting of transferring a malware sample's access to a specific I/O port to a specific I/O port in the real machine in which the virtual machine is operated may be registered. The process of transferring access to the I/O port in the virtual machine to the I/O port in the real machine may be realized using a function provided in each virtualization platform. The configuration contents 603 may include, for example, a setting such as of notifying a dummy response to a malware sample's access to a specific I/O port. For example, the dummy response may be a response imitating a response from an accessed device not included in the virtual machine to the device via an I/O port.

The analysis system 100 may set configuration contents 603 of an item "12001" to the virtual machine, as a standard (default) I/O port configuration. In this case, there occurs no I/O port access from a malware sample and, accordingly, the device emulation unit 206 may set the virtual machine to include minimum necessary I/O ports, as a standard setting. In that state, the device emulation unit 206 can reduce a processing load on the virtual machine required for emulating the real operating environment.

Fourth Specific Example

Hereinafter, a fourth specific example of the present example embodiment will be described. In the present specific example, appropriate processor information is notified to malware in accordance with the malware's operation. In this case, for example, processor configuration information illustrated in FIG. 7 is registered in the configuration information storage unit 304. In the processor configuration information illustrated in FIG. 7, similarly to the specific examples already described above, combinations of a detection result of detecting malware operation (detection contents 702) and emulation setting information associated with the detection result (configuration contents 703) are included as items. As illustrated in FIG. 7, the processor configuration information may also include item numbers 701 identifying the combinations of detection contents 702 and configuration contents 703.

The analysis system 100 (particularly, the device emulation unit 206) in the present specific example modifies information identifying a virtual processor in the virtual machine, on the basis of the emulation setting information. The analysis system 100 (particularly, the device emulation unit 206) may also change operation of the virtual machine for when malware has performed a process of identifying a virtual processor, on the basis of the emulation setting information. By the change, the device emulation unit 206 enables the virtual machine to notify an execution result as described below, to the malware having performed the process of identifying a processor. That is, the virtual machine notifies the malware of an execution result emulating a result that is obtained when the process is performed on a physical processor. More specifically, by the change, the virtual machine may notify an execution result equivalent or approximately equivalent to a result of when the process is performed on the physical processor, to the malware. The information identifying a processor may include any information about the processor such as information identifying the vendor of the processor, information representing a model (model number) of the processor and information about execution instructions supported by the processor.

Operation of the analysis system 100 in the present specific example is similar to that in the specific examples already described above and, accordingly omitting its detailed description, only operation of the device emulation unit 206 will be described below.

For example, when a detected malware operation corresponds to detection contents 702 of an item "13002", the sample accesses processor information. In this case, the execution instruction detection unit 204 detects, for example, a specific execution instruction (for example, a "CPUID" instruction in a CPU made by Intel Corporation, and the like) executed by the malware sample. In response to the detection, according to configuration contents 703 of the item "13002", the device emulation unit 206 sets the emulation environment to notify processor information on the real machine operating the virtual machine, as a processing result for the execution instruction. Specifically, the device emulation unit 206 may set the virtual machine (or the emulation environment) to trap an execution instruction for checking processor information which has been executed in the virtual machine, and respond to the instruction by notifying processor information of the actual machine. In this way, the analysis system 100 is able to appropriately analyze malware which determines whether in the real operating environment or not according to processor information.

The analysis system 100 may set configuration contents 703 of an item "13001" to the virtual machine, as a standard processor configuration information. In this case, there is no access to processor information from a malware sample and, accordingly, the device emulation unit 206 may set the virtual machine, for example, to notify information on a virtual processor constituting the virtual machine to the execution instruction for checking processor information. In that state, the device emulation unit 206 can reduce a processing load on the virtual machine required for emulating the real operating environment.

Fifth Specific Example

Hereinafter, as a fifth specific example of the present example embodiment, a case where a configuration of a file system in the emulation environment is set according to operation of malware to be analyzed. In this case, in the configuration information storage unit 304, for example, file system configuration information illustrated in FIG. 8 is registered. The file system configuration information illustrated in FIG. 8 includes, similarly to the specific examples already described above, combinations of a detection result of detecting malware operation (detection contents 802) and emulation setting information associated with the detection result (configuration contents 803) as items. As illustrated in FIG. 8, the file system configuration information may also include item numbers 801 identifying the combinations of detection contents 802 and configuration contents 803.

Operation of the analysis system 100 in the present specific example is similar to that in the specific examples already described above and, accordingly omitting its detailed description, only operation of the device emulation unit 206 will be described below.

For example, when a detected malware operation corresponds to detection contents 802 of an item "14002", the sample accesses a file system of the virtual machine (specifically, a folder structure in the file system). In this case, the execution instruction detection unit 204 detects, for example, a specific execution instruction executed by the malware sample (for example, an access instruction to a file or folder, or the like).

In response to the detection, the device emulation unit 206 performs a process described below, in accordance with configuration contents 803 of the item "14002". That is, the device emulation unit 206 builds a folder structure in the virtual machine which is similar to a folder structure in the real operating environment. For example, the device emulation unit 206 may copy the folder structure in the real operating environment into the virtual machine. Then, in the folder structure built in the virtual machine, the device emulation unit 206 modifies a file, folder or the like including confidential information so as to conceal it from the malware sample. Specifically, the device emulation unit 206 may delete the file, folder or the like including confidential information or replace it with dummy data. In this case, information identifying a file or folder corresponding to confidential information may be registered in advance in the analysis system 100 (for example, in the configuration information storage unit 304).

As a result of above-described processing, in response to an access instruction to a file system executed by the malware sample, a result of an access processing instruction executed on the folder structure built in the virtual machine is notified from the virtual machine. In this case, the malware sample cannot determine that the sample itself is being executed in the emulation environment. Accordingly, the analysis system 100 can appropriately analyze malware which determines whether in the real operating environment or not according to a file system configuration.

The analysis system 100 may set configuration contents 803 of an item "14001" to the virtual machine, as a standard file system configuration (folder structure). In this case, there is no access to the file system (folder structure) by a malware sample and, accordingly, the device emulation unit 206 may build, for example, a standard folder structure which is predetermined in the virtual machine. In this case, the device emulation unit 206 can reduce a processing load on the virtual machine required for emulating the real operating environment.

In the specific examples described above, for example, the device emulation unit 206 may initialize the emulation environment and the virtual machine, in the step S901, using configuration contents of the respective standard settings (the items 10001, 11001, 12001, 13001 and 14001).

Operation of the analysis system 100 in the present exemplary embodiment has been described above using the specific examples, but the analysis system 100 is not limited to the specific examples described above. By a process similar to the above-described specific examples, the analysis system 100 may appropriately set up any other constituent elements constituting the emulation environment or the virtual machine, in accordance with malware operation. For example, when malware accesses a BIOS (Basic Input and output System), the analysis system 100 may set (modify) a configuration of the emulation environment (virtual machine) using an emulation setting for returning an appropriate response to the BIOS access.

A program which can be analyzed by the analysis system 100 according to the present example embodiment described above is not limited to a malicious program such as malware. That is, the analysis system 100 may analyze any program executed in the emulation environment. For example, the analysis system 100 may be used in an inspection process in the course of program development. In this case, by the use of the analysis system 100, it is possible to analyze operation of a developed program before introducing it into a real operating environment, by executing the program in an emulation environment.

Second Example Embodiment

Figure 11:
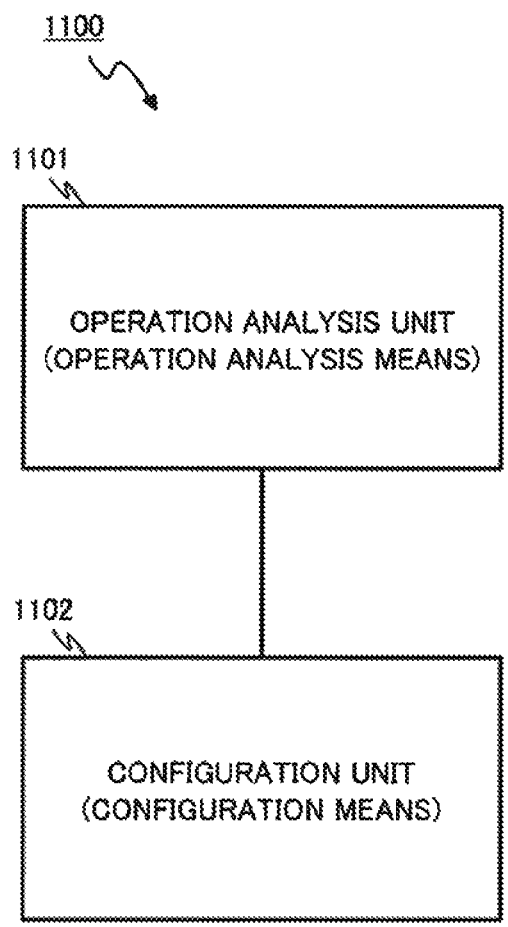
FIG. 11 is a block diagram illustrating a functional configuration of an analysis system in a second example embodiment of the present invention.
Figure 12:
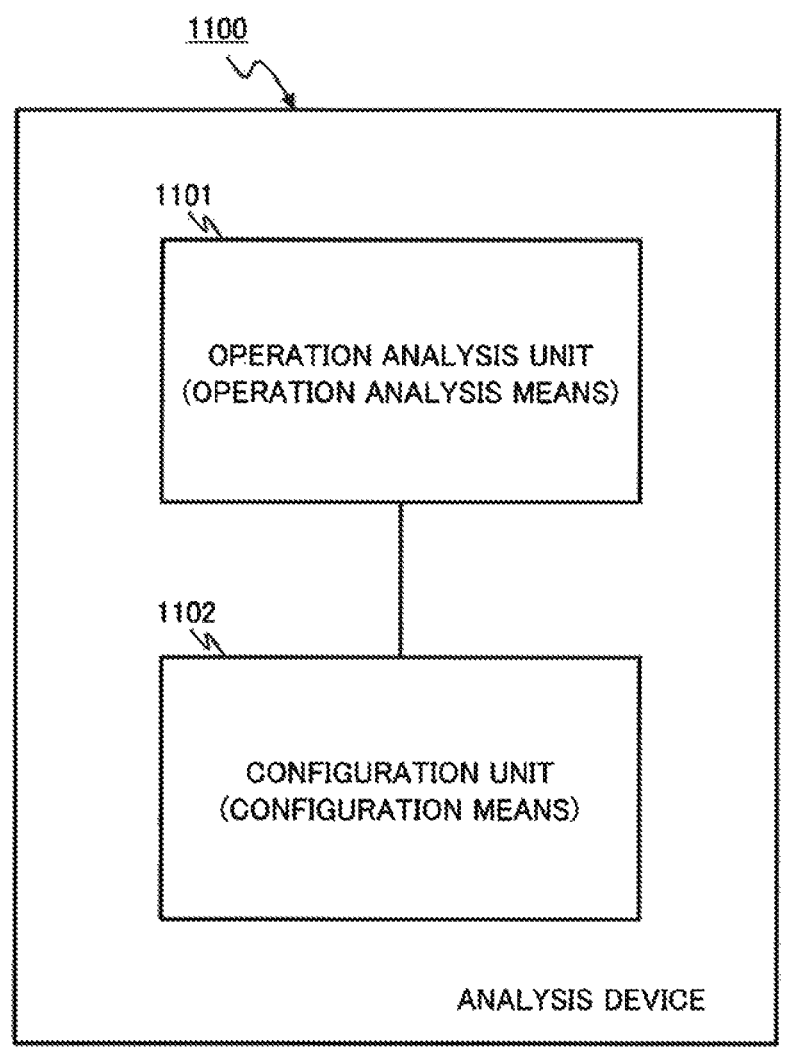
FIG. 12 is a block diagram illustrating a configuration capable of realizing the analysis system in the second example embodiment of the present invention as a single apparatus.

Next, a second example embodiment of the present invention will be described. FIG. 11 is a block diagram illustrating a functional configuration of an analysis system 1100 in the present example embodiment. As illustrated in FIG. 11, the analysis system 1100 in the present example embodiment includes an operation analysis unit 1101 and a configuration unit 1102. The operation analysis unit 1101 may function as a means for operation analysis, and the configuration unit 1102 may function as a means for configuration. The operation analysis unit 1101 and the configuration unit 1102 are communicatively connected with each other by the use of any communication means. As illustrated in FIG. 12, the analysis system 1100 may be configured using a single device (a physical or virtual machine). In this case, the analysis system 1100 functions as a single analysis apparatus.

The operation analysis unit 1101 analyzes operation of an analysis target program, which is a program to be analyzed, by executing the analysis target program in a second execution environment capable of emulating at least a partial configuration of a first execution environment where the analysis target program can be executed. The analysis target program may be, for example, a malicious program such as malware. The operation analysis unit 1101 may include a similar configuration to that of the operation analysis unit 101 in the first example embodiment.

The configuration unit 1102 modifies at least a partial configuration of the second execution environment, in accordance with an operation of the analysis target program having been analyzed in the operation analysis unit 1101. In this way, the configuration unit 1102 builds the second execution environment that is able to emulate a specific configuration in the first execution environment associated with the above-described operation of the analysis target program. The configuration unit 1102 may be configured similar to the configuration unit 102 in the first example embodiment. The first execution environment may be, for example, the real operating environment in the first example embodiment, and the second execution environment may be, for example, the emulation environment in the first example embodiment.

In the present example embodiment configured as described above, the analysis target program is not able to determine whether the analysis target program itself is executed in the first execution environment or in the second execution environment. The reason is that, by modifying a configuration of the second execution environment in accordance with an operation of the analysis target program, the analysis system 1100 builds the second execution environment to emulate a specific configuration of the first execution environment. Accordingly, for example, when the analysis target program has performed a specific operation in the second execution environment, an execution result emulating the first execution environment is notified from the second execution environment to the analysis target program.

As a result, the analysis system 1100 in the present example embodiment can appropriately analyze an original function of the program without affecting on the program's operation. Therefore, according to the analysis system 1100 in the present example embodiment, it is possible to analyze original operation of a program by building an appropriate analysis environment in accordance with the program's operation.

Modified Example of Second Example Embodiment

Figure 13:
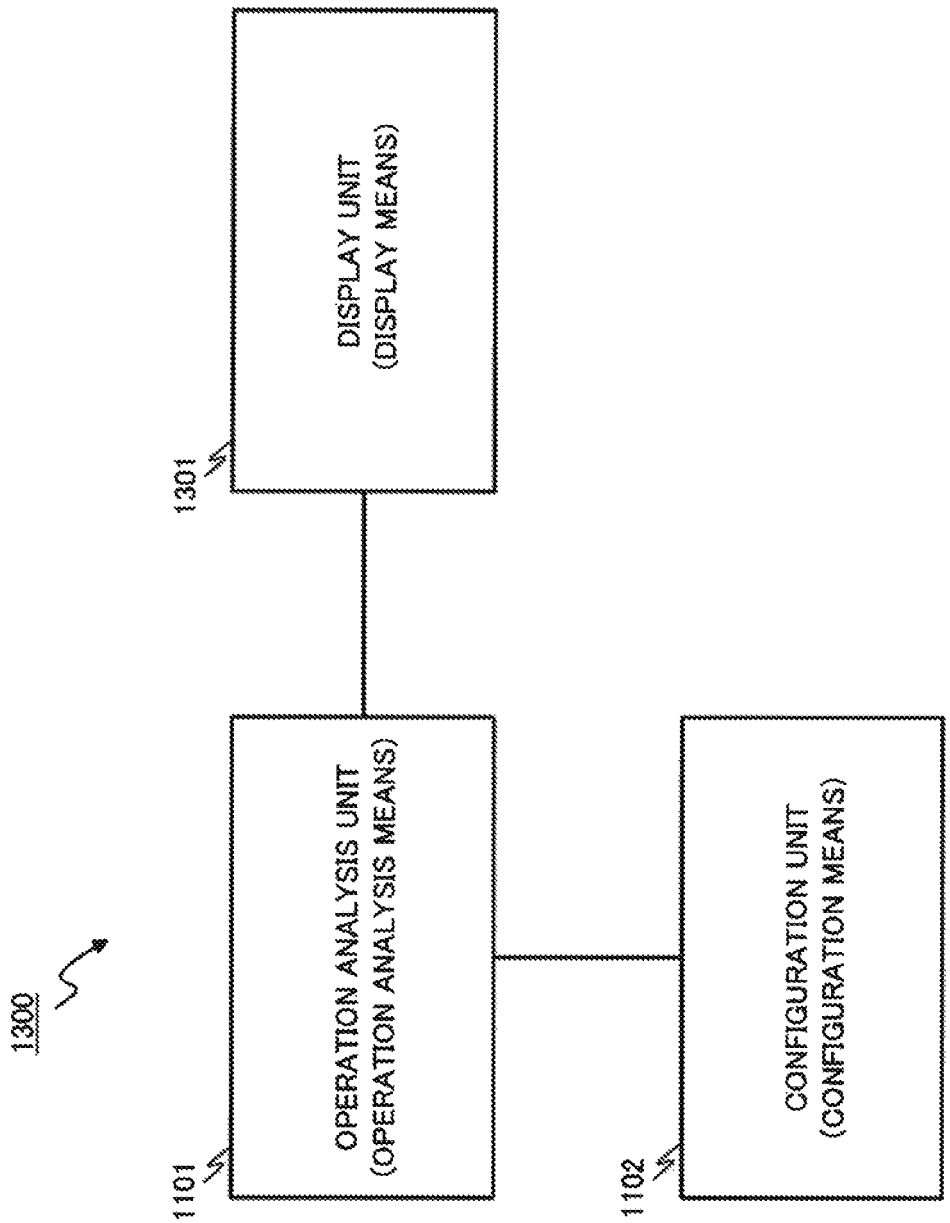
FIG. 13 is a block diagram illustrating a functional configuration of an analysis system according to a modified example of the second example embodiment of the present invention.

Next, a modified example of the second example embodiment will be described, with reference to FIG. 13. As illustrated in FIG. 13, an analysis system 1300 in the present modified example further includes a display unit 1301, in addition to the analysis system 1100 in the second example embodiment. The other constituent elements (an operation analysis unit 1101 and an configuration unit 1102) may be configured to be similar to those in the second example embodiment.

The display unit 1301 is a display means that is able to display a configuration of the virtual machine constituting the second execution environment. The display unit 1301 may also display a configuration of a virtual network constituting the second execution environment. For example, the display unit 1301 may acquire information representing the virtual machine configuration from the operation analysis unit 1101 and output the information to a display screen of a display device or the like. The display unit 1301 may be configured similar to the emulation configuration display unit 210 in the first example embodiment.

According to the analysis system 1300 in the present modified example configured as described above, for example, it is possible for a user of the analysis system 1300 to check a configuration of the virtual machine having been modified in accordance with operation of an analysis target program. Further, because the analysis system 1300 includes a similar configuration to that of the second example embodiment, it produces a similar effect to that of the second example embodiment.

<Configuration of Hardware and Software Program (Computer Program)>

Hereinafter, a hardware configuration capable of realizing the above-described example embodiments will be described.

In the following description, the analysis systems (100, 1100 and 1300) described in the example embodiments will be referred to as simply "the analysis system". Further, constituent elements of those analysis systems will be referred to as simply "the constituent elements of the analysis system".

The analysis system already described in the example embodiments may be configured with one or more dedicated hardware devices. In this case, the constituent elements shown in the drawings (FIG. 1 and FIGS. 11 to 13) may be implemented using hardware into which part or the whole of them is integrated (an integrated circuit into which processing logics are installed, a storage device and the like).

For example, when the analysis system is implemented by dedicated hardware, the constituent elements of the analysis system may be implemented using an integrated circuit (for example, an SoC (System on a Chip) or the like) capable of providing their functions. In this case, data to be stored in the constituent elements of the analysis system may be stored, for example, in a RAM (Random Access Memory) area or a flash memory area integrated into the SoC or in a storage device (a magnetic disk or the like) connected to the SoC. In this case, for a communication line connecting the constituent elements of the analysis system, a known communication bus may be employed. The communication line connecting the constituent elements is not limited to bus connecting, but the constituent elements may be connected with each other in a peer-to-peer manner. When the analysis system is configured with a plurality of hardware devices, the hardware devices may be communicatively connected with each other by any communication means (by wired or wireless, or by their combination).

Figure 14:
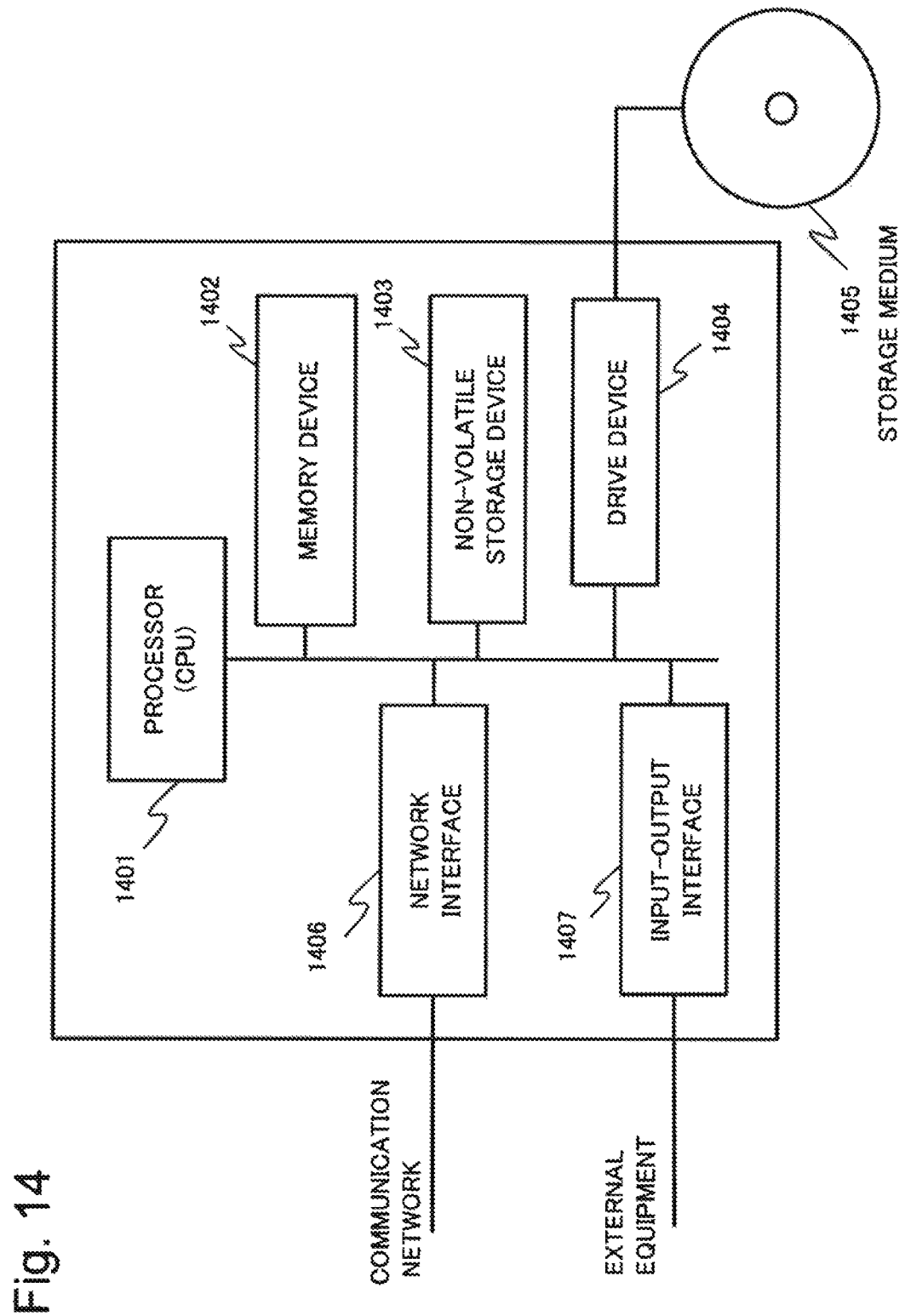
FIG. 14 is a diagram illustrating a hardware configuration capable of realizing the analysis systems in the respective example embodiments of the present invention.

Further, the analysis system or the constituent elements may be configured with general hardware illustrated in FIG. 14 and various software programs (computer programs) executed by the hardware. In this case, the analysis system may be configured with any number of general hardware devices and software programs.

A processing unit 1401 in FIG. 14 is an operational processing unit such as a general CPU (Central Processing Unit) or microprocessor. The processing unit 1401 may, for example, read various software programs stored in a non-volatile storage device 1403 described below into a memory device 1402 and perform a process according to the software programs. For example, the constituent elements of the analysis system in the example embodiments already described (the operation analysis unit (101 or 1101), the configuration unit (102 or 1102), or the like) can be realized as a software program executed by the processing unit 1401.

The memory device 1402 is a memory device such as a RAM which can be referred to from the processing unit 1401, and stores software programs, various kinds of data and the like. The memory device 1402 may also be a volatile memory device.

The non-volatile storage device 1403 is, for example, a storage device with non-volatility such as a magnetic disk drive and a semiconductor memory device by means of a flash memory. The non-volatile storage device 1403 can store various kinds of software programs, data and the like.

A network interface 1406 is an interface device for connecting to a communication network, for which, for example, an interface unit for wired and wireless LAN (Local Area Network) connection, that for SAN connection, and the like may be employed.

A drive device 1404 is, for example, a device for processing data reading and writing on a storage medium 1405 described below.

The storage medium 1405 is, for example, a storage medium capable of recording data, such as an optical disk, a magneto-optical disk and a semiconductor flash memory.

An input and output interface 1407 is a device for controlling input and output from and to an external device.

The analysis system (or the constituent elements) in the present invention, which has been exemplary described above as example embodiments, may be realized, for example, by providing the hardware device illustrated in FIG. 14 with a software program capable of realizing the functions described in the example embodiments. More specifically, the present invention may be realized, for example, by the processing unit 1401 executing the software program supplied to the hardware device. In this case, an operating system and middleware such as database management software, network software, a virtual environment platform which are working in the hardware device may execute part of the processes.

The software program may be recorded in the storage medium 1405. In this case, the software program may be configured to be appropriately installed into the non-volatile storage device 1403 via the drive device 1404, at a shipping stage, operation stage or the like of the analysis system or the like.

In this case, as a method of supplying various software programs to the above-described hardware device, a method of installing the programs into the device by using an appropriate tool at a production stage before shipping or a maintenance stage after shipping may be employed. Further, as the method of supplying various software programs, a currently popular procedure such as a method of downloading the programs from outside via a communication line such as the Internet may also be employed.

Then, in such cases, the present invention can be regarded as being configured with code constituting the software programs, or with a computer readable storage medium storing the code. In this case, the storage medium is not limited to a medium separated from the hardware device, but includes also a storage medium into which a software program transmitted via a LAN or the Internet is downloaded and stored or temporarily stored.

Further, the analysis system may also be configured with a virtual environment in which the hardware device illustrated in FIG. 14 is virtualized and various software programs (computer programs) executed in the virtual environment. In this case, the constituent elements of the hardware device illustrated in FIG. 14 are provided as virtual machines in the virtual environment. Also in this case, the present invention can be realized by a similar configuration to that of when configuring the hardware device illustrated in FIG. 14 as a physical device.

The present invention has been described, by use of above-described exemplary embodiments where the present invention is applied, for example. However, the technical scope of the present invention is not limited to that of the descriptions of the example embodiments. It is obvious to those skilled in the art that a variety of changes or improvements can be made to the example embodiments. In such cases, any new example embodiment achieved by making such changes or improvements also may be embraced within the technical scope of the present invention. Further, any example embodiment achieved by combining the above-described example embodiments or any new example embodiment achieved by making such changes or improvements also may be embraced within the technical scope of the present invention. It is obvious from matters described in claims.

This application is based upon and claims the benefit of priority from Japanese Patent Application No. 2015-120712 filed on Jun. 16, 2015, the disclosure which is incorporated herein in its entirety by reference.

REFERENCE SIGNS LIST 100 analysis system
101 operation analysis unit
102 configuration unit
201 sample storage unit
202 sample preparation unit
203 sample analysis unit
204 execution instruction detection unit
205 detection result transmission unit
206 device emulation unit
207 emulation setting receiver
208 analysis result container
209 analysis result storage unit
301 detection result receiver
302 configuration adjustment unit
303 emulation setting transmission unit
304 configuration information storage unit
1100 analysis system
1101 operation analysis unit
1102 configuration unit
1301 display unit
1401 processing unit
1402 memory device
1403 non-volatile storage device
1404 drive device
1405 storage medium
1406 network interface
1407 input and output interface

What is claimed is:

1. A method comprising:
executing a malicious program in an execution environment on a virtual machine which emulates a real operating environment,
detecting an operation the malicious program performs in the execution environment, the operation performed by the malicious program being an operation to determine whether the malicious program is operated on the execution environment or the real operating environment, and
performing a reaction based on the operation being detected,
wherein information associating the operation and the reaction is stored in a memory, and
wherein the execution environment is configured with the virtual machine and a virtualization platform.

2. The method according to claim 1, wherein,
the operation comprises accessing an internal network, and
the reaction comprises virtually building the internal network.

3. The method according to claim 1, wherein,
the operation comprises accessing an external network, and
the reaction comprises allowing access to the external network via TOR.

4. The method according to claim 1, wherein,
the operation comprises accessing an I/O port, and
the reaction comprises concealing a specific I/O port.

5. The method according to claim 1, wherein,
the execution environment is provided by the virtual machine configured to emulate the real operating environment and to analyze the malicious program,
the malicious program is malware, and
the reaction comprises emulating the real operating environment.

6. The method according to claim 5, wherein,
the operation comprises accessing a folder, and
the reaction comprises creating a folder structure in the virtual machine similar to a folder structure in the real operating environment.

7. The method according to claim 1, wherein,
the execution environment is provided by the virtual machine configured to emulate the real operating environment and to analyze the malicious program,
the malicious program is malware, and
the reaction comprises deceiving the malicious program by emulating the real operating environment.

8. The method according to claim 1, further comprising storing the information associating the operation and the reaction in the memory.

9. An analysis device comprising:
a memory storing instructions; and
one or more processors configured to execute the instructions to:
execute a malicious program in an execution environment on a virtual machine which emulates a real operating environment,
detect an operation the malicious program performs in the execution environment, the operation performed by the malicious program being an operation to determine whether the malicious program is operated on the execution environment or the real operating environment, and
perform a reaction based on the operation being detected,
wherein information associating the operation and the reaction is stored in the memory, and
wherein the execution environment is configured with the virtual machine and a virtualization platform.

10. The analysis device according to claim 9, wherein,
the operation comprises accessing an internal network, and
the reaction comprises virtually building the internal network.

11. The analysis device according to claim 9, wherein,
the operation comprises accessing an external network, and
the reaction comprises allowing access to the external network via TOR.

12. The analysis device according to claim 9, wherein,
the operation comprises accessing an I/O port, and
the reaction comprises concealing a specific I/O port.

13. The analysis device according to claim 9, wherein,
the execution environment is provided by the virtual machine configured to emulate the real operating environment and to analyze the malicious program,
the malicious program is malware, and the reaction comprises emulating the real operating environment.

14. The analysis device according to claim 13, wherein, the operation comprises accessing a folder, and the reaction comprises creating a folder structure in the virtual machine similar to a folder structure in the real operating environment.

15. The analysis device according to claim 9, wherein, the execution environment is provided by the virtual machine configured to emulate the real operating environment and to analyze the malicious program, the malicious program is malware, and the reaction comprises deceiving the malicious program by emulating the real operating environment.

16. The analysis device according to claim 9, wherein the one or more processors are further configured to execute the instructions to store the information associating the operation and the reaction in the memory.

17. A non-transitory computer-readable recording medium having recorded thereon instructions for executing a method, the method comprising:

executing a malicious program in an execution environment on a virtual machine which emulates a real operating environment, detecting an operation the malicious program performs in the execution environment, the operation performed by the malicious program being an operation to determine whether the malicious program is operated on the execution environment or the real operating environment, and performing a reaction based on the operation being detected, wherein information associating the operation and the reaction is stored in the non-transitory computer-readable medium, and wherein the execution environment is configured with the virtual machine and a virtualization platform.

* * * * *